United States Patent
Liao

(10) Patent No.: US 10,625,579 B2
(45) Date of Patent: Apr. 21, 2020

(54) CONCEALED SUN VISOR

(71) Applicant: Cheng-Chang Liao, Citong Township (TW)

(72) Inventor: Cheng-Chang Liao, Citong Township (TW)

( * ) Notice: Subject to any disclaimer, the term of this patent is extended or adjusted under 35 U.S.C. 154(b) by 0 days.

(21) Appl. No.: 16/176,794

(22) Filed: Oct. 31, 2018

(65) Prior Publication Data

US 2020/0079188 A1    Mar. 12, 2020

(30) Foreign Application Priority Data

Sep. 6, 2018 (TW) .............................. 107131385 A

(51) Int. Cl.
*B60J 3/02* (2006.01)

(52) U.S. Cl.
CPC ........... *B60J 3/0208* (2013.01); *B60J 3/0278* (2013.01)

(58) Field of Classification Search
CPC .............................. B60J 3/0208; B60J 3/0278
USPC .................. 296/97.8, 97.2, 97.6, 97.9, 97.11
See application file for complete search history.

(56) References Cited

U.S. PATENT DOCUMENTS

| 5,283,683 A * | 2/1994 | Yamamoto ............. B60J 3/0208 296/97.8 |
| 5,662,371 A | 9/1997 | Gera et al. |
| 2012/0133173 A1* | 5/2012 | Watase ................... B60J 3/0208 296/97.8 |
| 2016/0250910 A1* | 9/2016 | Barna .................... B60J 3/0208 296/97.8 |

* cited by examiner

*Primary Examiner* — Joseph D. Pape
(74) *Attorney, Agent, or Firm* — Muncy, Geissler, Olds & Lowe, P.C.

(57) ABSTRACT

A concealed sun visor includes a body having a receiving portion. The receiving portion includes two lateral grooves respectively extending transversely from two ends of a top edge and an open end opposite to the top edge. A holding and positioning mechanism includes a holding portion extending outward from an edge thereof. A light filter is mounted in the receiving portion and has an edge securely mounted in the holding portion. Two pressing members are disposed on two ends of the holding and positioning mechanism, respectively. The two ends of the holding and positioning mechanism are received in the two lateral grooves. Each pressing member is biased outward to press against a wall of a respective lateral groove to thereby provide a retaining force holding the light filter in the two lateral grooves. The light filter is movable between a storage position and an extended position for blocking light.

7 Claims, 7 Drawing Sheets

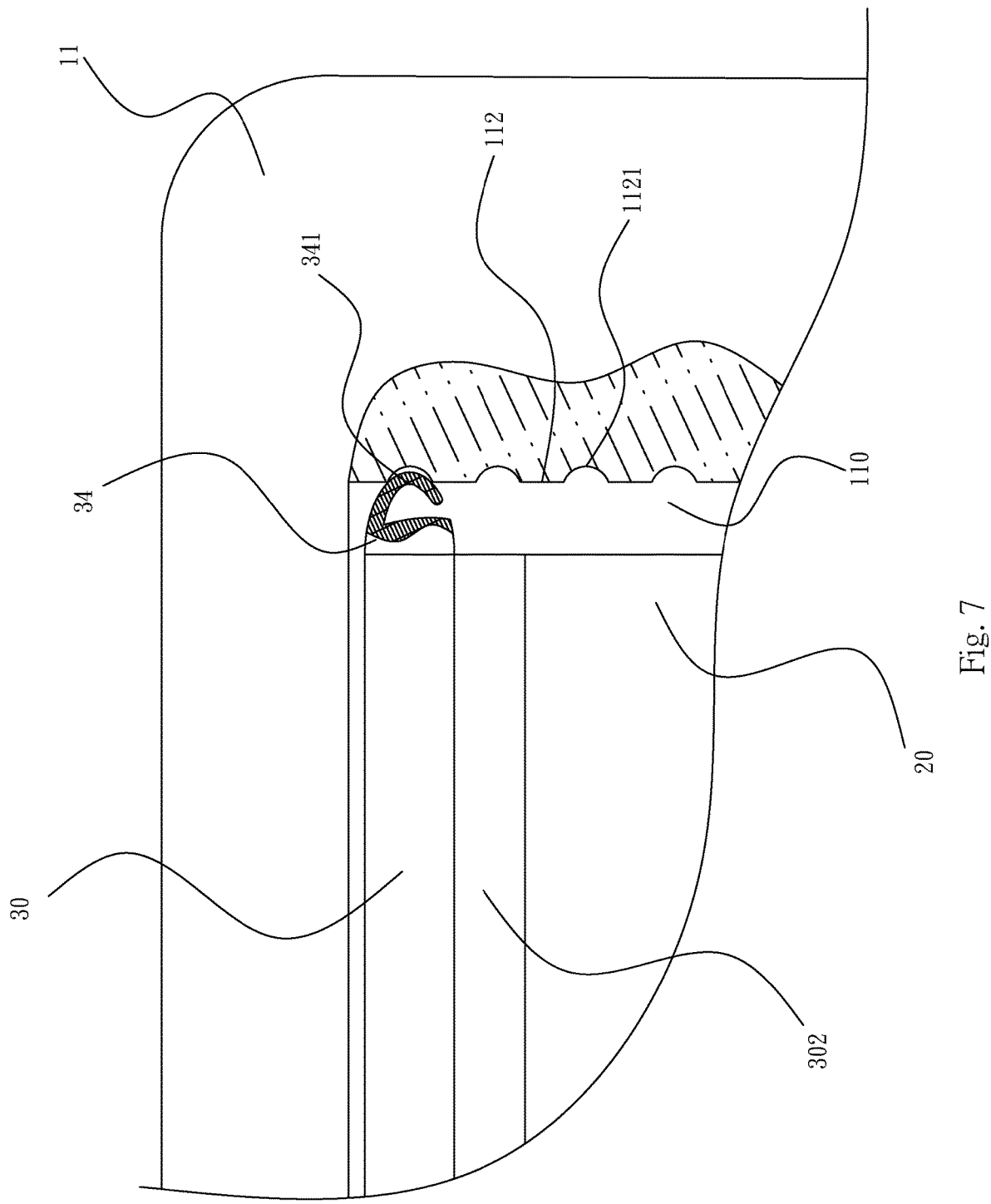

CONCEALED SUN VISOR

BACKGROUND OF THE INVENTION

The present invention relates to a concealed sun visor and, more particularly, to a concealed sun visor including a light filter that can be pulled out of the sun visor to shield light for enhancing the driving safety and that can be stored in the sun visor to provide an aesthetic appearance.

FIG. 1 shows a dashboard C in an interior space I of a vehicle. The driver sitting behind the steering wheel SW can be aware of the traffic conditions behind the vehicle through the rearview mirror RM and the two side view mirrors SM. When encountering light incident through the windshield FW, the driver generally moves the sun visor 10 to a position blocking the light. However, the conventional sun visor 10 is not transmittable to light and, thus, should not be too large to adversely affect the driving safety. It is therefore always a problem to effectively block the light by troublesome adjustment of the position of the sun visor 10 while trying not to adversely affect the driving safety.

In an approach to fulfill the need of improving driving safety while effectively filtering light encountered in the conventional sun visors not transmittable to light, a light-transmittable light filter is clipped to the sun visor. When encountering light, the driver can pivot the light filter at a side of the sun visor downward to shield the eyes from the light, increasing the driving safety. However, the light filter clipped to the sun visor is visually protrusive and would block a make-up mirror and a night lamp, if any, disposed on the sun visor.

U.S. Pat. No. 5,662,371 discloses a sun visor light reducer extension having a three-sided rigid frame capable of being incorporated within a vehicle's sun visor. A light filter is received in a groove defined by the rigid frame and has a pair of guide stops protruding slightly upward from its surface. An elastic urging member is disposed between two pivoted leg segments of the rigid frame. Each leg segment has a stopping tab extending inward. The stopping tabs act as a stopping means during discharge of the light filter by forming a barrier when impinged against the guide stops. However, the resultant structure has a significant thickness and, thus, limits its practical utility. Furthermore, the guide stops can only prevent the light filter from falling out of the sun visor. Namely, there are no mechanisms for precisely positioning the light filter, such that the light filter might slide downward. Thus, the practical use of the sun visor light reducer extension would be unsatisfactory.

BRIEF SUMMARY OF THE INVENTION

A concealed sun visor according to the present invention includes a body having a receiving portion. The receiving portion includes a top edge and two lateral grooves extending transversely from two ends of the top edge, respectively. The receiving portion further includes an open end opposite to the top edge. A light filter is mounted in the receiving portion. A holding and positioning mechanism includes a holding portion extending outward from an edge thereof. An edge of the light filter is securely mounted in a gap of the holding portion. Two pressing members are disposed on two ends of the holding and positioning mechanism, respectively. Each of the two pressing members is biased outward. The two ends of the holding and positioning mechanism are received in the two lateral grooves of the receiving portion. Each of the two pressing members presses against a wall of a respective one of the two lateral grooves to provide a retaining force holding the light filter in a desired location in the two lateral grooves. The light filter is configured to be movable between a storage position and an extended position for blocking light by manually moving into or out of the body through the open end.

In an example, a lid is mounted on top of the body to cover the receiving portion except the open end. The light filter is restrained to move relative to the body through the open end. A spacing between the lid and a bottom wall of the receiving portion is slightly larger than or equal to a thickness of the holding and positioning mechanism or the light filter.

In an example, the light filter is a board having a thickness and made of a light-permeable material or a light-impermeable material. The board made of the light-permeable material is a light-permeable board with a light-filtering effect. The board made of the light-impermeable material is a light-impermeable board for increasing a light-blocking area.

In an example, each of the two ends of the holding and positioning mechanism includes a receiving hole and an elastic element received in the receiving hole, and each elastic element biases a respective one of the two pressing members outward.

In an example, two sliding members are respectively received in the two ends of the holding and positioning mechanism. Two balls are respectively mounted on outer ends of the two sliding members. An elastic element is mounted in the holding and positioning mechanism and includes two ends respectively pressing against the two sliding members to press the two balls against the walls of the two lateral grooves of the receiving portion.

In an example, two sliding members are respectively received in the two ends of the holding and positioning mechanism. Two balls are respectively mounted on outer ends of the two sliding members. A partitioning plate is mounted in the holding and positioning mechanism. Two elastic elements are mounted in the holding and positioning mechanism and are located on two sides of the partitioning plate. The two elastic elements respectively press against the two sliding members to press the two balls against the walls of the two lateral grooves of the receiving portion.

In an example, each of the two ends of the holding and positioning mechanism includes a receiving hole. The holding and positioning mechanism includes two pressing members disposed outside of the receiving holes, respectively. Each of the two pressing members includes a resilient plate at a distal end thereof. Each resilient plate slidably presses against the wall of the respective one of the two lateral grooves.

The present invention will become clearer in light of the following detailed description of illustrative embodiments of this invention described in connection with the drawings.

DESCRIPTION OF THE DRAWINGS

FIG. 7 is a partial, cross sectional view of a concealed sun visor of yet another embodiment according to the present invention.

DETAILED DESCRIPTION OF THE INVENTION

Figure 1:
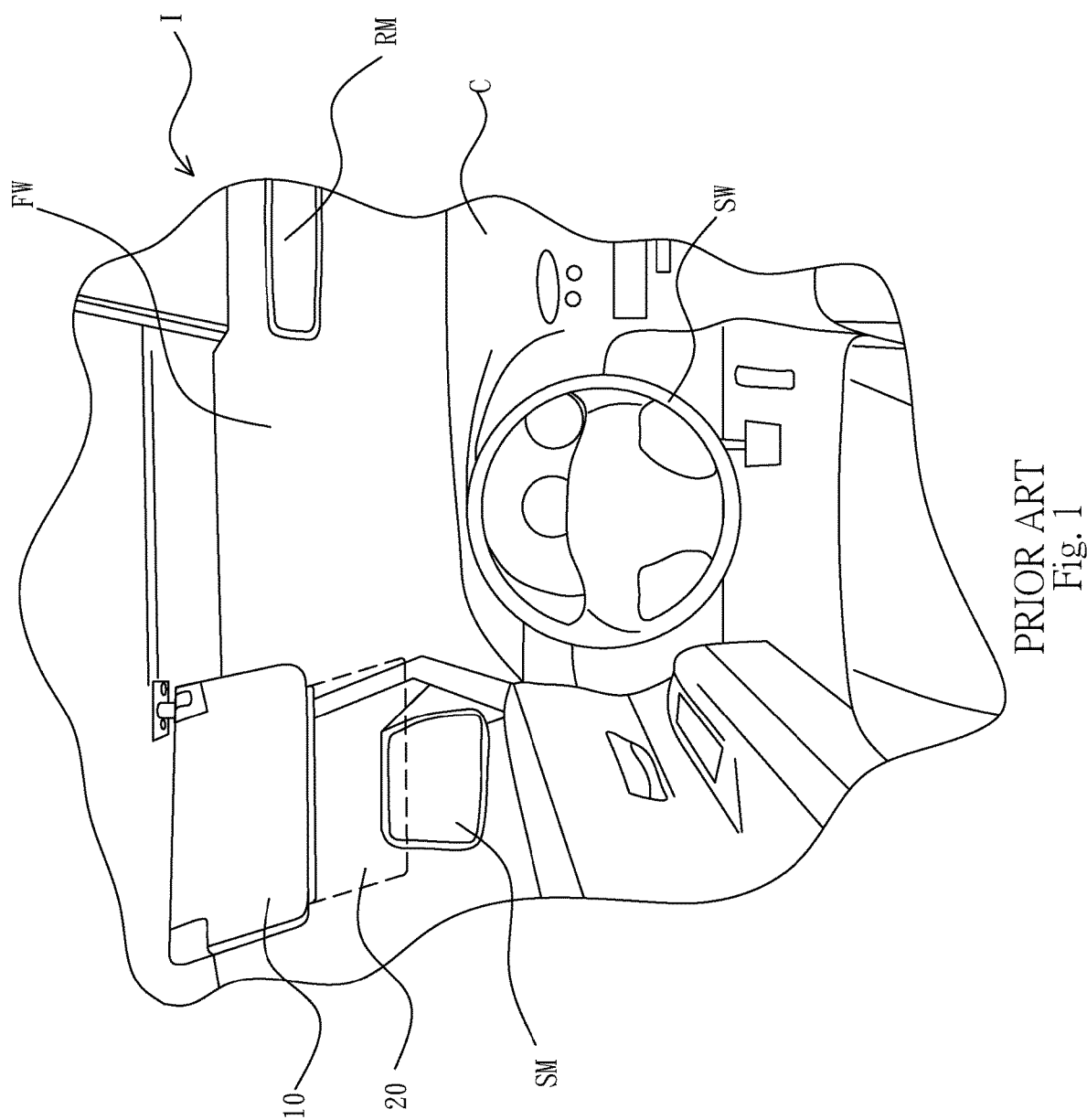
FIG. 1 is a diagrammatic view illustrating a portion of an interior space of a vehicle.
Figures 2, 2A:
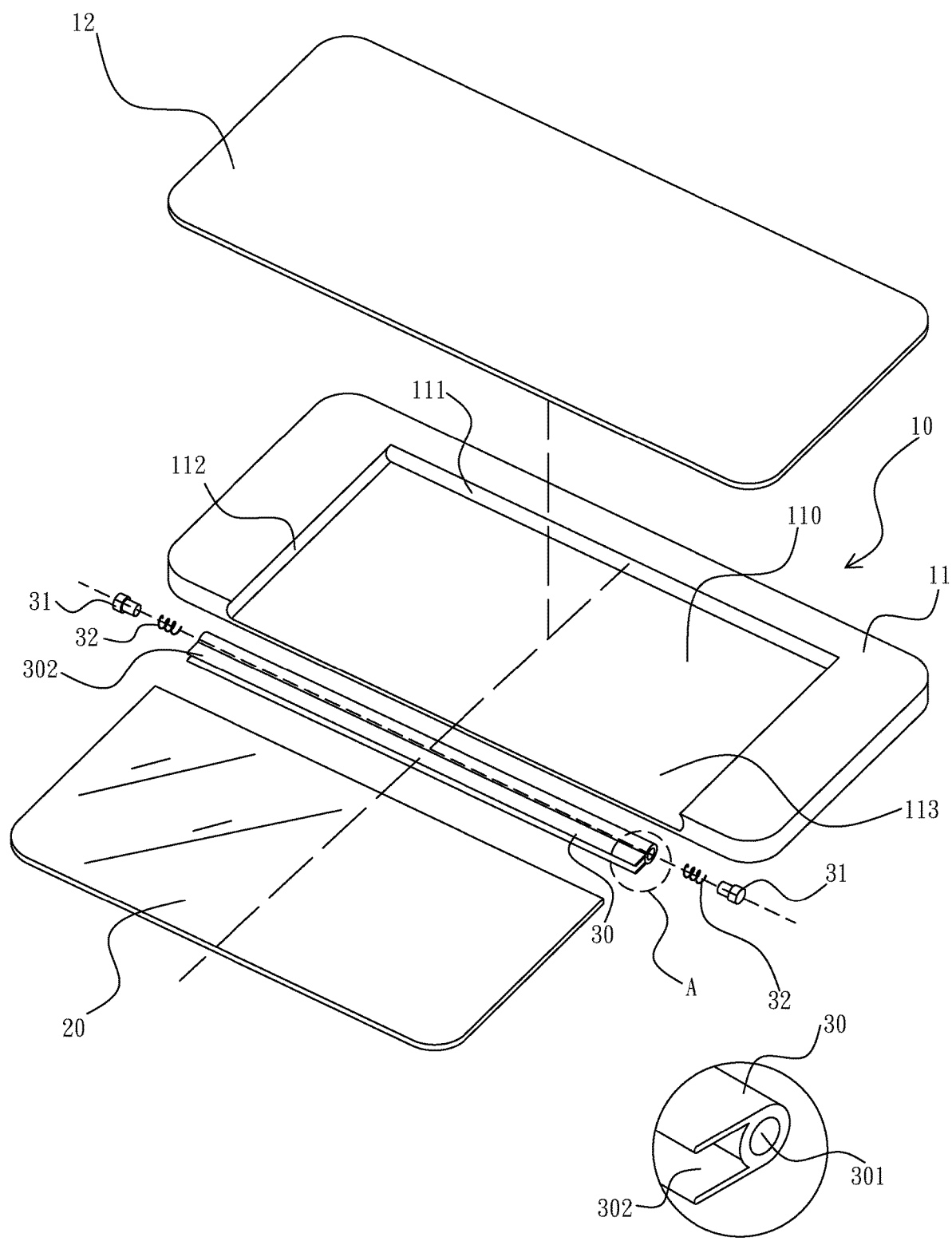
FIG. 2 is an exploded, perspective view of a concealed sun visor of an embodiment according to the present invention.
FIG. 2A is an enlarged view of a circled portion of FIG. 2.

FIG. 2 shows an exploded, perspective view of a concealed sun visor of an embodiment according to the present invention. The concealed sun visor according to the present invention includes a light filter 20 that can be concealed and stored in the sun visor 10. The light filter 20 can block light in an actual product. In this embodiment, the sun visor 10 includes a body 11 and a lid 12. The body 11 includes a receiving portion 110 in the form of a groove. The receiving portion 110 includes a top edge 111 and two lateral grooves 112 extending transversely from two ends of the top edge 111, respectively. In this embodiment, the two lateral grooves 112 are two concave grooves extending away from each other to form two sliding channels. Furthermore, the receiving portion 110 includes an open end 113 opposite to the top edge 111.

Figure 3:
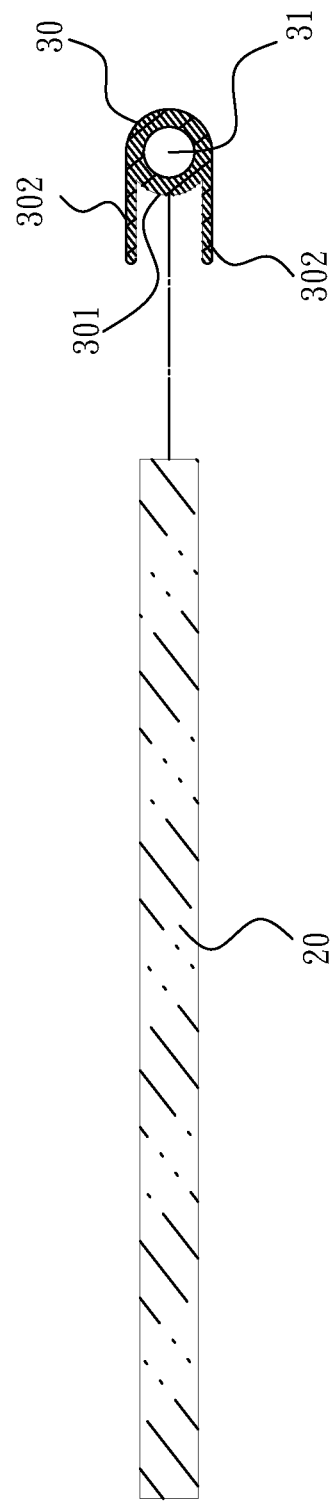
FIG. 3 is an exploded, cross sectional view of a portion of the concealed sun visor of FIG. 2.

FIG. 3 shows an exploded, cross sectional view of a portion of the concealed sun visor of FIG. 2. A light filter 20 is mounted in the receiving portion 110 of the sun visor 10. The light filter 20 is a board having a thickness and is made of a light-permeable material or a light-impermeable material. In an example, the board made of the light-permeable material is a light-permeable board with a light-filtering effect. In another example, the board made of the light-impermeable material is a light-impermeable board for increasing a light-blocking area. The width and thickness of the light filter 20 are slightly smaller to be received in the compartment 110.

The holding and positioning mechanism 30 is in the form of an elongated rod in this embodiment. Each of two ends of the holding and positioning mechanism 30 includes a receiving hole 301. Two wings extend from an outer periphery of the rod and together form a holding portion 302. An edge of the light filter 20 is securely mounted in a gap between the two wings of the holding portion 302 by screwing, bonding, hot melting, etc. Each receiving hole 301 of the holding and positioning mechanism 30 includes receives an elastic element 32 and a pressing member 31 biased by the elastic element 32 outward to a position outside of the receiving hole 301. Thus, each elastic element 32 provides a respective one of the two pressing members 31 with an outward pressing force.

Figure 4:
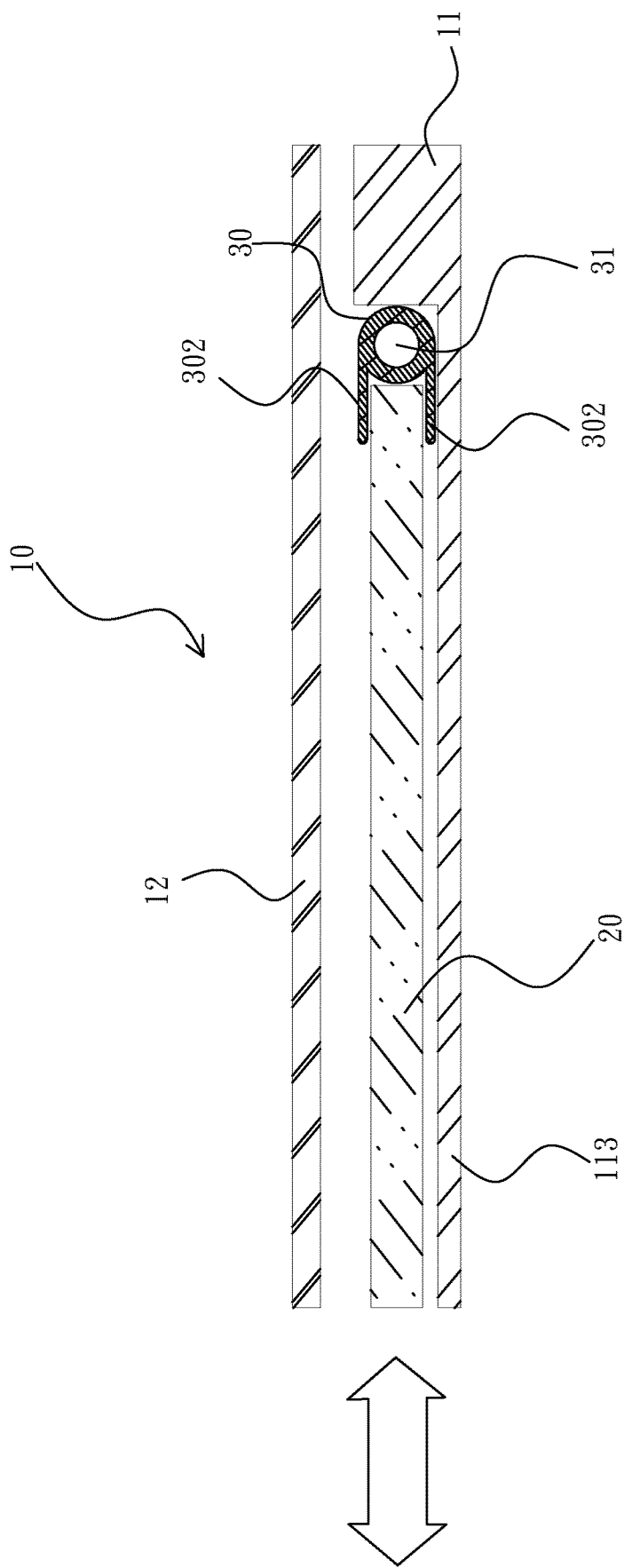
FIG. 4 is a cross sectional view of the concealed sun visor of FIG. 2.

FIG. 4 is a cross sectional view of the concealed sun visor of FIG. 2. After the light filter 20 and the holding and positioning mechanism 30 are fixed together, the light filter 20 is inserted into the sliding channels formed by the two lateral grooves 112 of the receiving portion 110 together with the holding and positioning mechanism 30. Furthermore, each of the two pressing members 31 on two ends of the holding and positioning mechanism 30 presses against a wall of a respective one of the two lateral grooves 112 to provide a retaining force holding the light filter 20 in the two lateral grooves 112. When not subject to an external force, the frictional force between each of the two pressing members 31 and the respective lateral groove 112 retains the light filter 20 in a desired location of the respective lateral groove 112 of the receiving portion 110. A user can manually push the light filter 20 through the open end 113 into the body 11 to a storage position or can manually pull the light filter 20 out of the body 11 through the open end 113 to an extended position for blocking light, as shown by the arrow in FIG. 4.

After the light filter 20 and the holding and positioning mechanism 30 are inserted into the sliding channels formed by the two lateral grooves 112 of the receiving portion 110, a lid 12 having an area substantially the same as that of the body 11 is mounted on top of the body 11. The lid 12 can be mounted to the body 11 by screwing, gluing, etc. The lid 12 fixed to the top of the body 11 covers the receiving portion 110 except the open end 113. Thus, the light filter 20 is restrained to move relative to the body 11 through the open end 113 while a storage effect is provided. Furthermore, after the lid 12 is mounted, a spacing between the lid 12 and a bottom wall of the receiving portion 110 is slightly larger than or equal to a thickness of the holding and positioning mechanism 30 or the light filter 20.

Figure 5:
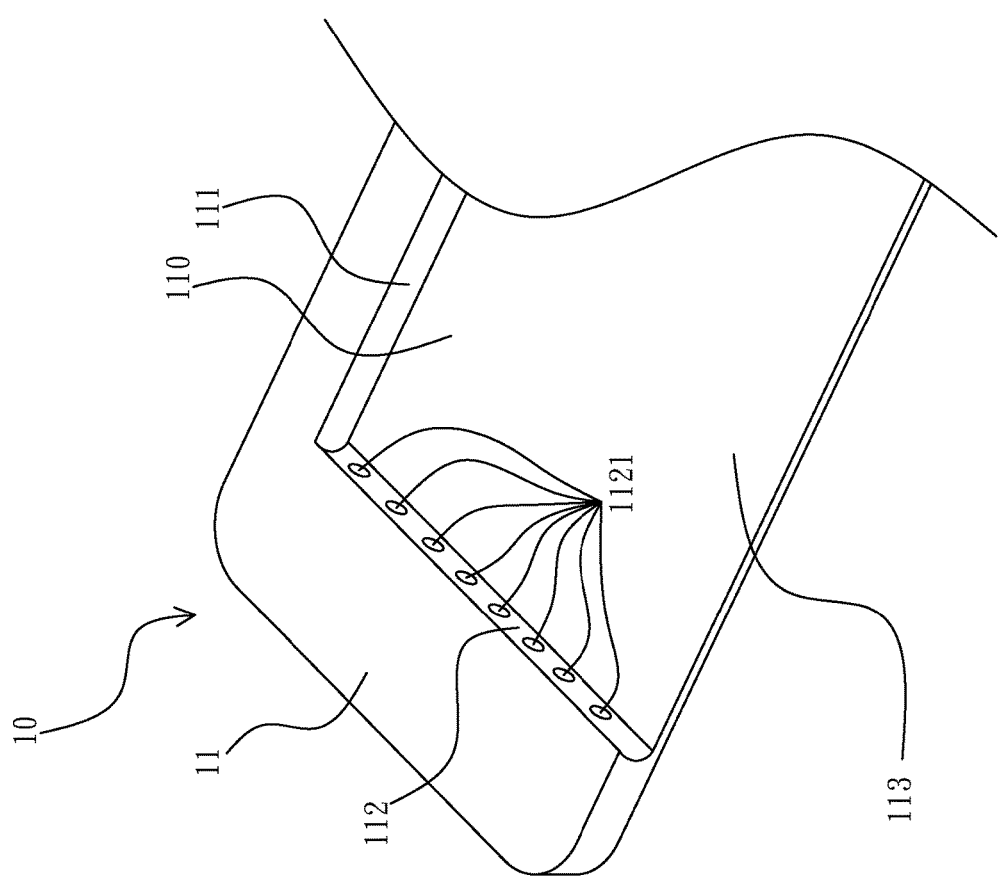
FIG. 5 is a partial, perspective view of a concealed sun visor of another embodiment according to the present invention.

FIG. 5 shows a partial, perspective view of a concealed sun visor of another embodiment according to the present invention. In this embodiment, the wall of each of the two lateral grooves 112 of the receiving portion 110 includes a plurality of recesses 1121. Each of the two pressing members 31 can enter a respective one of the plurality of recesses 121 under the bias of the respective elastic element 32 while the two ends of the holding and positioning mechanism 30 are moving along the two lateral grooves 112. Thus, a better retaining force is provided. Furthermore, the driver pulling the light filter 20 can feel jumping of the two positioning members 31 moving through the respective recesses 121 and, thus, can be more aware of the position of the light filter 20 relative to the sun visor 10.

Figure 6:
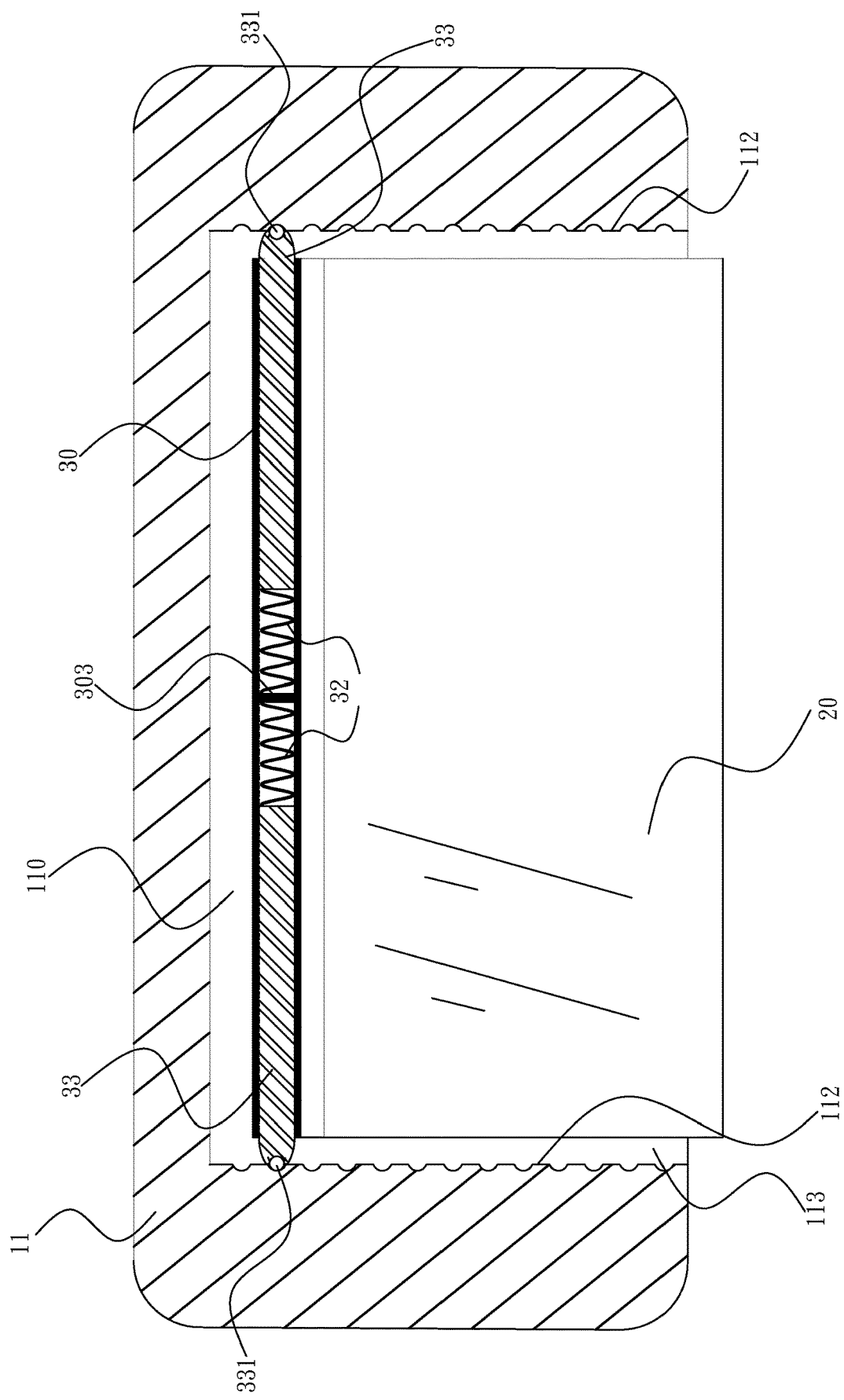
FIG. 6 is a cross sectional view of a concealed sun visor of still another embodiment according to the present invention.

FIG. 6 shows a cross sectional view of a concealed sun visor of still another embodiment according to the present invention. In this embodiment, two sliding members 33 are respectively received in the two ends of the holding and positioning mechanism 30, and two balls 331 are respectively mounted on outer ends of the two sliding members 33. A partitioning plate 303 is mounted in the holding and positioning mechanism 30. Two elastic elements 32 are mounted in the holding and positioning mechanism 30 and are located on two sides of the partitioning plate 303. The two elastic elements 32 respectively press against the two sliding members 33 to press the two balls 331 against the walls of the two lateral grooves 112 of the receiving portion 110. Since the two balls 331 can roll, the light filter 20 and the holding and positioning mechanism 30 can slide more easily in the receiving portion 110. The partitioning plate 303 provides a stable support for the two elastic elements 32 and the two sliding members 33. In an alternative embodiment, the holding and positioning mechanism 30 can include only one elastic element 32 and does not have to include the partitioning plate 303.

FIG. 7 shows a partial, cross sectional view of a concealed sun visor of yet another embodiment according to the present invention. In this embodiment, each of the two ends of the holding and positioning mechanism 30 includes a receiving hole 301. The holding and positioning mechanism 30 includes two pressing members 34 disposed outside of the receiving holes 301, respectively. Each of the two pressing members 34 includes a resilient plate 341 at a distal end thereof. In this embodiment, each resilient plate 341 is curved, is slidable along the wall of the respective one of the two lateral grooves 112, and presses against the wall of the respective one of the two lateral grooves 112. In this embodiment, the wall of each of the two lateral grooves 112 includes a plurality of recesses to retain the respective resilient plate 341. Thus, the light filter 20 and the holding and positioning mechanism 30 can be manually pulled or pushed to slide in the receiving portion 110 and can be stably positioned.

In view of the foregoing, the concealed sun visor according to the present invention provides the driver with an aesthetic sun visor 10 with an extended shielding effect. The concealed sun visor according to the present invention can be used on various vehicles and can provide an excellent effect with simple operation.

Although specific embodiments have been illustrated and described, numerous modifications and variations are still possible without departing from the scope of the invention. The scope of the invention is limited by the accompanying claims.

The invention claimed is:

1. A concealed sun visor comprising:
a body including a receiving portion, wherein the receiving portion includes a top edge and two lateral grooves extending transversely from two ends of the top edge, respectively, and wherein the receiving portion further includes an open end opposite to the top edge;
a light filter mounted in the receiving portion; and
a holding and positioning mechanism including a holding portion extending outward from an edge thereof, wherein an edge of the light filter is securely mounted in a gap of the holding portion, wherein two pressing members are disposed on two ends of the holding and positioning mechanism, respectively, and wherein each of the two pressing members is biased outward,
wherein the two ends of the holding and positioning mechanism are received in the two lateral grooves of the receiving portion, wherein each of the two pressing members presses against a wall of a respective one of the two lateral grooves to provide a retaining force holding the light filter in a desired location in the two lateral grooves, and wherein the light filter is configured to be movable between a storage position and an extended position for blocking light by manually moving into or out of the body through the open end.

2. The concealed sun visor as claimed in claim 1, further comprising a lid mounted on top of the body to cover the receiving portion except the open end, wherein the light filter is restrained to move relative to the body through the open end, and wherein a spacing between the lid and a bottom wall of the receiving portion is slightly larger than or equal to a thickness of the holding and positioning mechanism or the light filter.

3. The concealed sun visor as claimed in claim 1, wherein the light filter is a board having a thickness and made of a light-permeable material or a light-impermeable material, wherein the board made of the light-permeable material is a light-permeable board with a light-filtering effect, and wherein the board made of the light-impermeable material is a light-impermeable board for increasing a light-blocking area.

4. The concealed sun visor as claimed in claim 1, wherein each of the two ends of the holding and positioning mechanism includes a receiving hole and an elastic element received in the receiving hole, and wherein each elastic element biases a respective one of the two pressing members outward.

5. The concealed sun visor as claimed in claim 1, wherein two sliding members are respectively received in the two ends of the holding and positioning mechanism, wherein two balls are respectively mounted on outer ends of the two sliding members, wherein an elastic element is mounted in the holding and positioning mechanism and includes two ends respectively pressing against the two sliding members to press the two balls against the walls of the two lateral grooves of the receiving portion.

6. The concealed sun visor as claimed in claim 1, wherein two sliding members are respectively received in the two ends of the holding and positioning mechanism, wherein two balls are respectively mounted on outer ends of the two sliding members, wherein a partitioning plate is mounted in the holding and positioning mechanism, wherein two elastic elements are mounted in the holding and positioning mechanism and are located on two sides of the partitioning plate, and wherein the two elastic elements respectively press against the two sliding members to press the two balls against the walls of the two lateral grooves of the receiving portion.

7. The concealed sun visor as claimed in claim 1, wherein each of the two ends of the holding and positioning mechanism includes a receiving hole, wherein the holding and positioning mechanism includes two pressing members disposed outside of the receiving holes, respectively, wherein each of the two pressing members includes a resilient plate at a distal end thereof, and wherein each resilient plate slidably presses against the wall of the respective one of the two lateral grooves.

\* \* \* \* \*